United States Patent
Rabii et al.

(10) Patent No.: US 9,124,970 B2
(45) Date of Patent: Sep. 1, 2015

(54) SYSTEM AND METHOD FOR USING A HEADSET JACK TO CONTROL ELECTRONIC DEVICE FUNCTIONS

(71) Applicant: QUALCOMM Incorporated, San Diego, CA (US)

(72) Inventors: Khosro Mohammad Rabii, San Diego, CA (US); Sherman Sebastian Antao, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 13/947,877

(22) Filed: Jul. 22, 2013

(65) Prior Publication Data

US 2015/0023516 A1    Jan. 22, 2015

(51) Int. Cl.
| | |
|---|---|
| H04M 1/00 | (2006.01) |
| H04M 9/00 | (2006.01) |
| H04R 5/04 | (2006.01) |
| H04R 3/00 | (2006.01) |
| G06F 3/16 | (2006.01) |
| H04R 1/10 | (2006.01) |

(52) U.S. Cl.
CPC ........ *H04R 5/04* (2013.01); *G06F 3/165* (2013.01); *H04R 1/1041* (2013.01); *H04R 3/00* (2013.01); *H04R 2205/022* (2013.01); *H04R 2225/61* (2013.01); *H04R 2420/03* (2013.01); *H04R 2430/01* (2013.01); *H04R 2460/01* (2013.01)

(58) Field of Classification Search
CPC .......... H04R 5/04; H04R 1/1041; H04R 3/00; H04R 2225/61; H04R 2460/01
USPC .......... 381/370, 384, 74; 379/430; 455/575.2, 455/41.1; 345/173
See application file for complete search history.

(56) References Cited

U.S. PATENT DOCUMENTS

| | | | |
|---|---|---|---|
| 7,805,171 | B2 | 9/2010 | Alameh et al. |
| 8,238,590 | B2 | 8/2012 | Burge et al. |
| 2006/0045304 | A1 | 3/2006 | Lee et al. |
| 2007/0121959 | A1 | 5/2007 | Philipp |
| 2010/0275052 | A1* | 10/2010 | Ku .............................. 713/501 |
| 2011/0007028 | A1 | 1/2011 | Curtis et al. |
| 2012/0281850 | A1 | 11/2012 | Hyatt |
| 2013/0005303 | A1 | 1/2013 | Song et al. |
| 2013/0109311 | A1* | 5/2013 | Moosavi ..................... 455/41.1 |
| 2013/0182867 | A1 | 7/2013 | Knowles |
| 2013/0250502 | A1* | 9/2013 | Tossavainen et al. .... 361/679.01 |
| 2013/0281024 | A1* | 10/2013 | Rofougaran et al. ........ 455/63.1 |
| 2014/0270229 | A1* | 9/2014 | Braho, Keith ................. 381/74 |

OTHER PUBLICATIONS

Kuo, Ye-Sheng, et al., "Hijacking Power and Bandwidth from the Mobile Phone's Audio Interface," ACM DEV'10, Dec. 17-18, 2010, London, UK, pp. 10.

(Continued)

*Primary Examiner* — Tuan D Nguyen
(74) *Attorney, Agent, or Firm* — Knobbe Martens Olson and Bear LLP (57) ABSTRACT

Systems and methods for automatically controlling an electronic device based on whether or not a headset is in a listening position are described. The existing wired stereo headset conductors may be used to provide power to a sensor and hardware subsystem within the headset. In some aspects, a sensor-enabled headset or headphones can sense whether each earbud of the headset is placed in the user's ears and communicate that information to an electronic device.

13 Claims, 10 Drawing Sheets

(56) References Cited

OTHER PUBLICATIONS

Lewis, Jerad, "Understanding Microphone Sensitivity," Analog Dialogue 46-05 Back Burner, May 2012, pp. 1-3.
Newman, Jared, "Sony Ericsson Earbuds Detect Presence of Ears," 2013, 1 page.
Robinson, A., et al., "Demo Abstract: AudioDAQ: Turning the Mobile Phone's Headset Port into a Universal Data Acquisition Interface," IPSN'12, Apr. 16-20, 2012, Beijing, China, pp. 2.
International Search Report and Written Opinion—PCT/US2014/041131—ISA/EPO—Oct. 15, 2014.

* cited by examiner

SYSTEM AND METHOD FOR USING A HEADSET JACK TO CONTROL ELECTRONIC DEVICE FUNCTIONS

INCORPORATION BY REFERENCE TO ANY PRIORITY APPLICATIONS

Any and all applications for which a foreign or domestic priority claim is identified in the Application Data Sheet as filed with the present application, are hereby incorporated by reference under 37 CFR 1.57.

BACKGROUND

1. Field of the Invention

The systems and methods disclosed herein relate generally to intelligent systems for controlling electronic devices through a headset jack. Particularly, embodiments relate to earphones powered by an existing headset connector that can control functions of an electronic device by sending signals to the electronic device through the headphone connector.

2. Description of the Related Art

In today's fast moving technology development for the mobile sector, user experience and battery life are two of the most important metrics. Effort should be made to manage the power consumption for a feature when it is not in use or not providing any value to the user. Actively managing the power consumption of a feature adds value to the system by contributing to longer battery life through smarter use of features. In addition, if there is a way to customize the response of a mobile device based on a more context-aware method or system the device can deliver a more compelling user experience.

Typical wired headsets connect a mobile device to a set of speakers and microphones with several audio-centric fixed-function conductors. Unlike their wireless counterparts, these wired headsets lack any ability to signal user interface (UI) commands to the mobile device to control operations such as volume control, pause, play, fast forward, etc. This inability to control platform operations often minimizes headset usability and platform Quality of Service (QoS). For example, when a user removes the headset from one or both ears to listen to other sounds, both resource inefficiency (providing sound unnecessarily in the unused earpieces) and possible interference with noise cancellation functions may result. Additionally, a lack of UI control on wired headsets forces the user to engage with UI controls located on the mobile device (key/buttons or touchscreen) which operate with longer latency and consume considerably more battery power.

For example, when a user desires to listen to an audio sound using the headset, the user must position a headset within or near the ear and the user must also issue a command to the host device to provide the audio signals. This command may take the form of pressing a button on the host device. This is an inconvenience to the user in that the host device may not be easily accessible to the user, such as when the user is operating a vehicle. Furthermore, the host device typically does not provide audio signals automatically when the headset is in a listening position.

In another example, a user may desire to stop listening to the audio signals provided by the host device. To stop listening to the audio signals, the user typically removes the headset from the ear and also issues a command to the host device to instruct the host device to stop sending the audio signals to the headset, such as by pressing a button on the host device. As in the above-described example, this is an inconvenience to the user in that the host device does not automatically stop sending audio signals when the headset is not in a listening position within or on the user's ear.

Furthermore, if the user does not instruct the host device to stop sending audio signals to the headset when the earphone or earbud has been removed from the ear, the host device may waste battery power providing unnecessary audio signals to the headset.

SUMMARY

Aspects of the disclosure relate to systems and methods for automatically controlling a host device based on whether or not a headset is in a listening position by "hijacking" the existing wired stereo headset conductors to provide power to a sensor and hardware subsystem within the headset. In some aspects, a sensor-enabled headset or headphones can sense whether each earbud is placed in the user's ears and communicate that information to a mobile device.

Body capacitance is a physical property of the human body that makes it act as a capacitor. Like other electrically-conductive objects, a human body can store electric charge if insulated. The actual amount of capacitance varies with the body's surroundings; it can be low when standing on top of a pole with nothing nearby or high when leaning against an insulated by grounded metal surface, such as a refrigerator. Body capacitance can be used to operate pushbutton switches. A capacitive touch sensor responds to a close approach of a human fingertip. The capacitance between the device itself and the fingertip may be sensed. Body capacitance can cause slight frequency shifts in a frequency oscillator. Depending on the frequency detected, different features may be activated when a user contacts a touch panel electrically connected to a frequency oscillator.

Embodiments of the invention relate to a unique electrode solution that can detect human skin and can distinguish the electrical characteristics of the skin. In this way the sensor can be tuned to only trigger an event when it is the ear and not in contact with any other part of the body such as the hand, or the neck. The sensor can also be tuned to register different frequencies associated with different functions, such as volume control or other user interface controls through a headphone jack of a handheld device. This avoids false positives in predicting the state of the user's intent.

Embodiments also take advantage of the existing electrical wiring interface between the headset and the electronic device to power the sensor as well as relay information to the processor of the electronic device. This makes systems incorporating embodiments compatible with mobile devices in the market today, only requiring a software upgrade.

In one aspect, a device for communicating with an electronic device through a headset port includes a control device comprising a first capacitive touch sensor, wherein the control device is configured to receive power and communicate with the electronic device through a headset connection and a modulation circuit within the control device and configured to modulate an electronic signal to the headset connection based on contact with the capacitive touch sensor.

In another aspect, an apparatus for communicating with an electronic device includes means for detecting touch configured to receive power and communicate with the electronic device through a headset connection and means for modulating an electronic signal to the headset connection based on touch detection.

In yet another aspect, a method of controlling a function of an electronic device, through a headphone jack, includes monitoring a headphone jack for one or more predetermined oscillation frequencies in the headset connections in the headphone jack and identifying when a predetermined oscillation frequency is transmitted on one or more of the headset connections. If the predetermined oscillation frequency is identified, the method includes carrying out a specific function on the electronic device. In some aspects, the electronic device is a wireless telephone. In other aspects, carrying out a specific function includes turning off music playing in one or more earpieces. In other aspects, carrying out a specific function includes controlling the music, volume or display parameters of the electronic device.

In another aspect, a computer readable medium includes instructions that when executed on a processor perform a method including the steps of monitoring a headphone jack for one or more predetermined oscillation frequencies in the headset connections in the headphone jack and identifying when a predetermined oscillation frequency is transmitted on one or more of the headset connections, wherein if the predetermined oscillation frequency is identified, carrying out a specific function on the electronic device.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Embodiments relate to systems and methods for controlling an electronic device through a headphone port, such as a standard 3.5 mm or a 2.5 mm headset receptacle. For example, embodiments relate to sensor-enabled headphones or other devices that can be used to control functions of the electronic device by sending detectable signals through the headphone port which are detected and interpreted by modules or programs running in the electronic device. In some aspects, a relaxation oscillator can transmit frequency shift information to inform the host device of a touch detection event and/or to transmit and receive user interface commands to and from the host device, such as audio commands including play, pause, fast forward, reverse, etc. In other aspects, voltage shift information may be used to inform the host device of a touch detection event and to transmit and receive user interface commands to the host device through the headphone port.

One example of such a device is a sensor-enabled headset that can sense whether each earbud is placed in the user's ears and communicate that information to the mobile device. In one aspect, a minimally-invasive sensor is embedded in each earbud and uses the existing headset signals to power the sensor as well as send information back to the electronic device. There are several sensor choices based on the type of electronic device, the use case and the market conditions. However, one aspect includes a capacitive touch sensor integrated into the headset and powered by the current used to bias the microphone in headphone port. With this configuration, the connectors on existing mobile devices can remain as they are while still powering the sensor and being used to interpret signals sent to the electronic device. By redesigning the headset new value can be added to the user experience through convenience and improved battery performance.

Implementations disclosed herein provide systems, devices, and methods for using existing wired headset conductors to power a minimum hardware subsystem in a wired headset to signal whether the earpiece or earpieces is in a listening position. The hardware subsystem can further provide user interface (UI) control and receive UI commands to scale audio processing to adjust audio renditions and maximize battery cycle-life and quality of service (QoS). For example, in one aspect, each earbud may have a capacitive touch sensor such that when the earbud is inserted in or on the ear, the host device detects the touch capacitance. In response to touch detection, the host device can send audio signals to the earbud. If the host device does not receive notification from the detection plate, the host device can stop sending audio signals to one or both earbuds. In some implementations, the capacitive touch sensors are different sizes or shapes so that contacting each one provides a distinguishable signal to the connected device. Thus, the connected device could determine whether the right or the left earbud was touching an ear.

A stereo set of headphones or ear buds may be used with a portable media player for playing reproduced stereo media content. Such a device includes a loudspeaker or earbud worn at the user's left ear and a loudspeaker or earbud worn in the same fashion at the user's right ear. Such a device may also include, at each of the user's ears, a respective one of a pair of noise reference microphones that are disposed to produce environmental noise signals to support an ANC function. The environmental noise signals produced by the noise reference microphones are not typically used to support processing of the user's voice.

Figure 1:
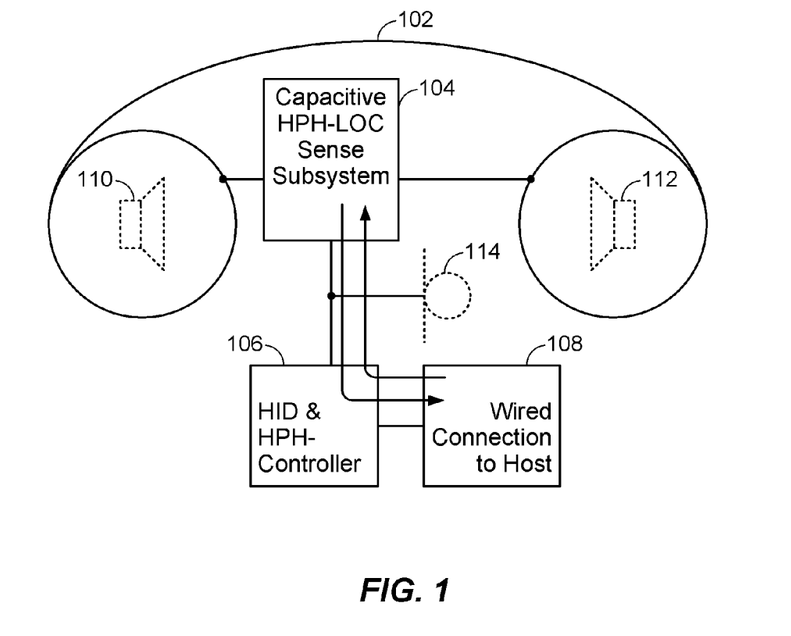
FIG. 1 is a schematic diagram of a headset without error microphones including a detection subsystem powered by the existing headset connectors, according to one embodiment.

FIG. 1 illustrates a wired headset 102 having a capacitive touch detection and user interface control subsystem 104, according to one embodiment. In this embodiment, the wired headset 102 does not have active noise cancellation features. The wired headset 102 may have one or two earbuds that include the left and right speakers 110, 112 to transmit audio signals to a user. The headset 102 may also have a microphone 114 to receive audio signals and transmit them to the host device for processing. The capacitive touch detection and user interface control subsystem 104 can receive power through the existing microphone channel conductors via the wired connection to the host processor 108. Each earbud may have a capacitive element configured to determine whether the earbud is placed in or near a user's ear. The capacitive element may further enable the reception and transmission of user interface control signals to and from an electronic device. The wired headset 102 and the capacitive touch detection and user interface control subsystem may be one means for detecting touch configured to receive power and communicate with the electronic device through a headset connection.

The power received through the existing microphone channel conductors can be used to power a touch detection circuit located within the headset. The existing microphone channel conductors can further be used to deliver user interface (UI) commands to the host. For example, in some embodiments, the user may remove or disengage an earbud from the ear. In response to a detected change registered by the touch detection subsystem 104, a headset controller 106 could send a command to the host processor 108 via the existing microphone channel conductors, instructing the host to stop sending audio signals to the disengaged earbud.

In some embodiments, a headset may include active noise cancellation (ANC) features. Active noise cancellation (ANC, also called active noise reduction) is a technology that actively reduces ambient acoustic noise by generating a waveform that is an inverse form of the noise wave (e.g., having the same level and an inverted phase), also called an "antiphase" or "anti-noise" waveform. An ANC system generally uses one or more microphones to pick up an external noise reference signal, generates an anti-noise waveform from the noise reference signal, and reproduces the anti-noise waveform through one or more loudspeakers. This anti-noise waveform interferes destructively with the original noise wave to reduce the level of the noise that reaches the ear of the user. Active noise cancellation techniques may be applied to sound reproduction devices, such as headphones, and personal communications devices, such as cellular telephones, to reduce acoustic noise from the surrounding environment. In such applications, the use of an ANC technique may reduce the level of background noise that reaches the ear (e.g., by up to twenty decibels) while delivering useful sound signals, such as music and far-end voices.

Figure 2:
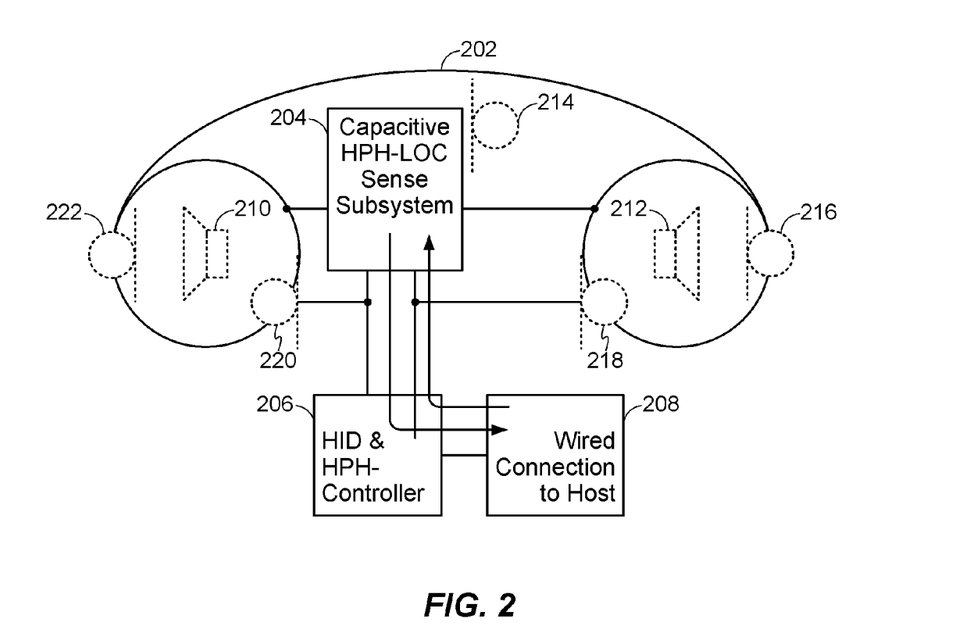
FIG. 2 is a schematic diagram of a headset having error microphones including a detection subsystem powered by the existing headset connectors, according to one embodiment.

In FIG. 2, a second embodiment of a wired ANC headset 202 is illustrated. The wired ANC headset 202 may have one or two earbuds having left and right speakers 210, 212 to transmit audio signals to a user. The headset 202 may also have a microphone 214 to receive audio signals and transmit them to the host device for processing. The wired ANC headset 202 may also have a number of additional microphones 216, 218, 220, 222 to pick up an external noise reference signal that is used to generate an anti-noise waveform for active noise cancellation. As in FIG. 1, each earbud may include a capacitive element configured to transmit a signal to an electronic device to indicate whether the earbud is in or near a user's ear. Each capacitive element may send additional signals to the electronic device to indicate a user interface command, such as fast forward, play, pause, stop, rewind, etc. The capacitive touch detection and user interface control subsystem 204 can receive power through the existing microphone channel conductors through the wired connection to the host processor 208. The power received through the existing microphone channel conductors can be used to power a touch detection circuit located within the headset. The existing microphone channel conductors can further be used to deliver user interface (UI) commands to the host. For example, in some embodiments, the user may remove or disengage an earbud from the ear. In response to a detected change registered by the touch detection subsystem 204, a headset controller 106 could send a command to the host processor 208 via the existing microphone channel conductors, instructing the host to stop sending audio signals to the disengaged earbud.

Figure 3:
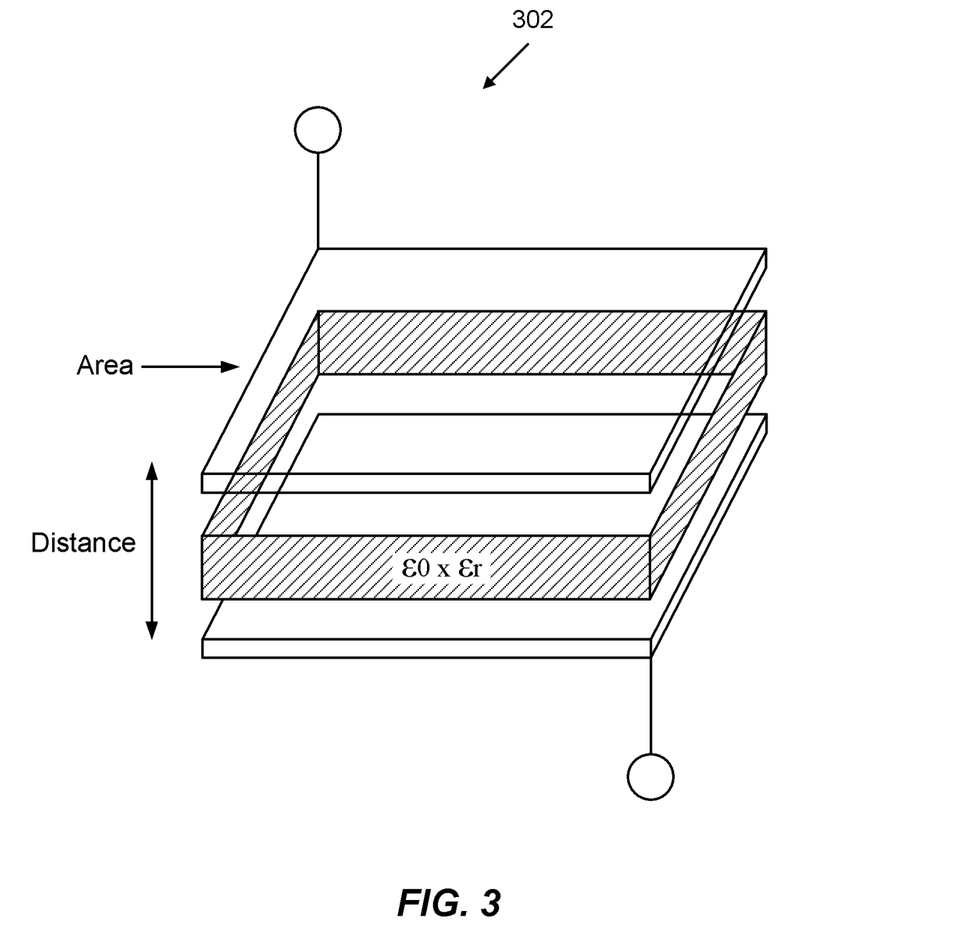
FIG. 3 is a schematic illustration of a capacitive touch sensor, according to one embodiment.

In some embodiments, a capacitive touch sensor may be used to detect whether an earbud is in a listening position in or on a user's ear. FIG. 3 illustrates one embodiment of a parallel-plate capacitor 302 that may be used as part of a capacitive touch sensor. The capacitance of a parallel-plate capacitor is directly proportional to the surface area of the conductor plates and inversely proportional to the separation distance between the plates. The capacitance also depends on the relative permittivity of the material between the plates of the capacitor, as compared to the permittivity of free-space. This capacitance may be expressed as:

$$C = \varepsilon_0 \varepsilon_r \frac{\text{Area}}{\text{Distance}}$$

Where C is the capacitance;
Area is the area of overlap of the two plates;
$\varepsilon_r$ is the relative static permittivity (also called the dielectric constant) of the material between the plates;
$\varepsilon_0$ is the electric constant; and
Distance is the separation between the plates.

Capacitance is proportional to the area of overlap and inversely proportional to the separation between conducting sheets. The closer the sheets are to each other, the greater the capacitance. The above equation is a good approximation if the distance between the plates is small compared to the other dimensions of the plates so the field in the capacitor over most of its area is uniform.

Figure 4:
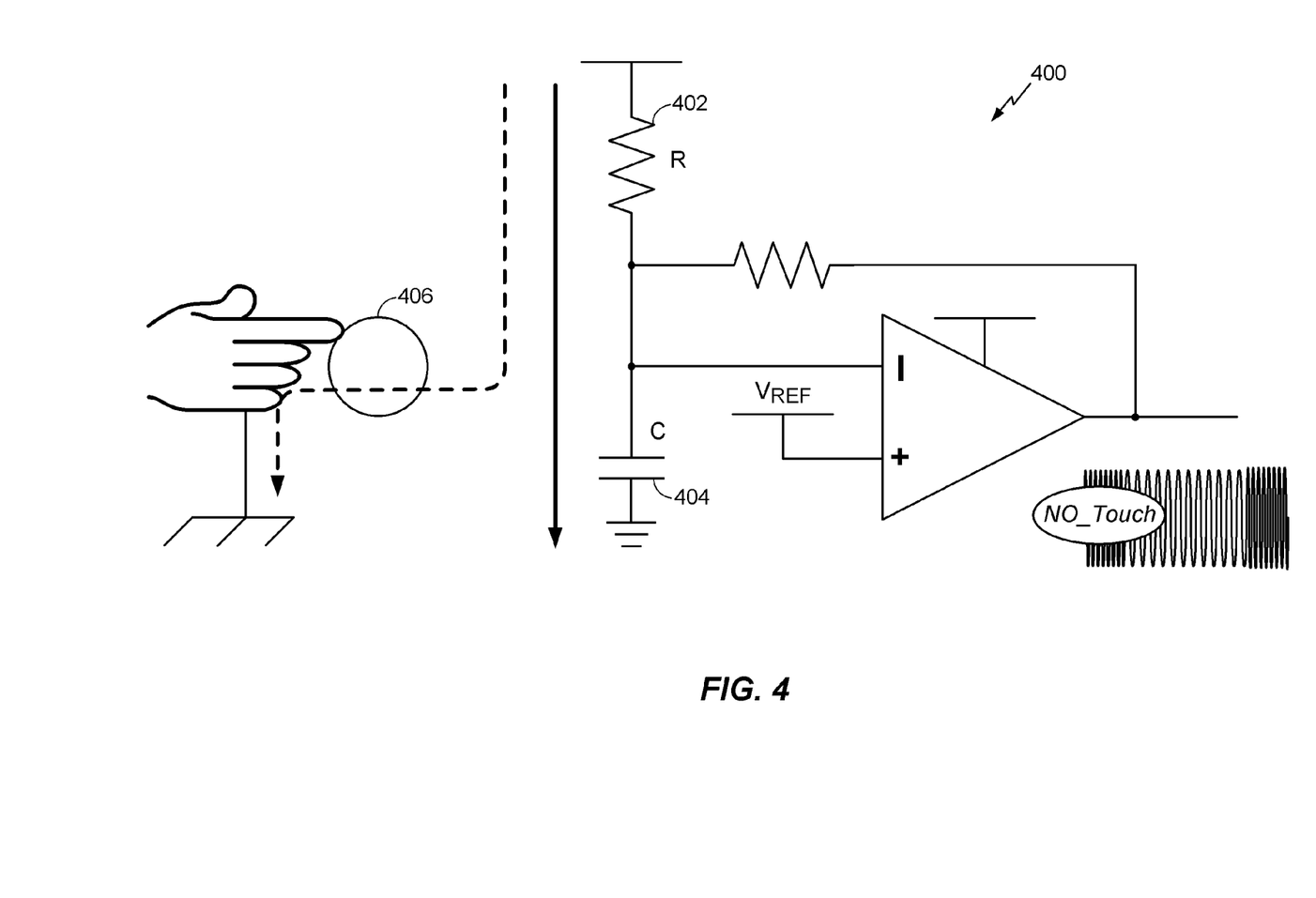
FIG. 4 is a circuit diagram of an RC oscillator circuit of a detection element of a detection earphone device in accordance with an embodiment.

An RC relaxation oscillator 400, in accordance with one embodiment, is shown in FIG. 4, and may be used as part of a capacitive touch sensor such as that shown in FIG. 3 to indicate whether an earbud is within a user's ear or to provide user interface control signals to a host device. Relaxation oscillators store energy in a capacitor, such as the capacitor shown in FIG. 3, and then dissipate that energy repeatedly to establish oscillations. For example, the capacitor can be charged toward a positive power supply until it reaches a threshold voltage sufficiently close to the supply. At that instant, the capacitor can be quickly discharged or shorted. Alternatively, when the capacitor reaches each threshold, the charging source can be switched from the positive power supply to the negative power supply or vice versa. In all such capacitor-based relaxation oscillators, the period of oscillations is set by the dissipation rate(s) of the capacitor. The RC relaxation oscillator 400, in combination with a headset such as that shown in FIGS. 1-2, may be one means for modulating an electronic signal to the headset connection based on touch detection.

With continued reference to FIG. 4, the RC oscillator 400 generates a specific frequency determined by the resistance, R, and the capacitance, C of a resistor 402 and a capacitor 404. A touch panel 406 can be grounded by contact with a particular medium, such as a user's ear, contacting the touch panel. This signal can be expressed as $C_{TOUCH}$. This additional capacitance from the user contacting the touch panel 406 changes the overall RC oscillator time constant and alters the oscillation frequency. Thus, in some embodiments, a change in oscillation frequency is detectable by software running on the host processor. The detection of a change in frequency can thereby signal that a touch event has occurred, such as when an earbud is inserted within the user's ear. Similarly, a change in oscillation frequency due to changes in detected capacitance when an earbud no longer contacts a user's ear can inform the host processor when an earbud has been removed from the user's ear. The host processor can then use this touch detection information to adjust the audio signals sent to the headset, such as discontinuing the transmission of an audio signal to a removed earbud or resuming audio signal transmission to an earbud that has been replaced in a user's ear. Furthermore, in some aspects, the touch sensors for the left and the right earbuds may be different sizes or shapes. This capacitance difference in the two dissimilar touch sensors causes two distinctly different touch events which can yield detectable resonance frequency shifts.

Traditional headsets further lack user interface controls such that the user must interact with the host device to control operation, such as fast forward, play, reverse, pause, stop, etc. In addition to providing earbud location information, a capacitive circuit, such as that shown in FIG. 4, may be used to send user interface control commands to the host device, such as audio commands including play, fast forward, reverse, stop, or pause, volume adjustment, or adjustment of display parameters of the electronic device. For example, different sized capacitance circuits may be used to cause different oscillator frequencies to be input to the electronic device. Those different frequencies may be detected, interpreted, and used for controlling various features of the electronic device through the headphone port.

Figure 5:
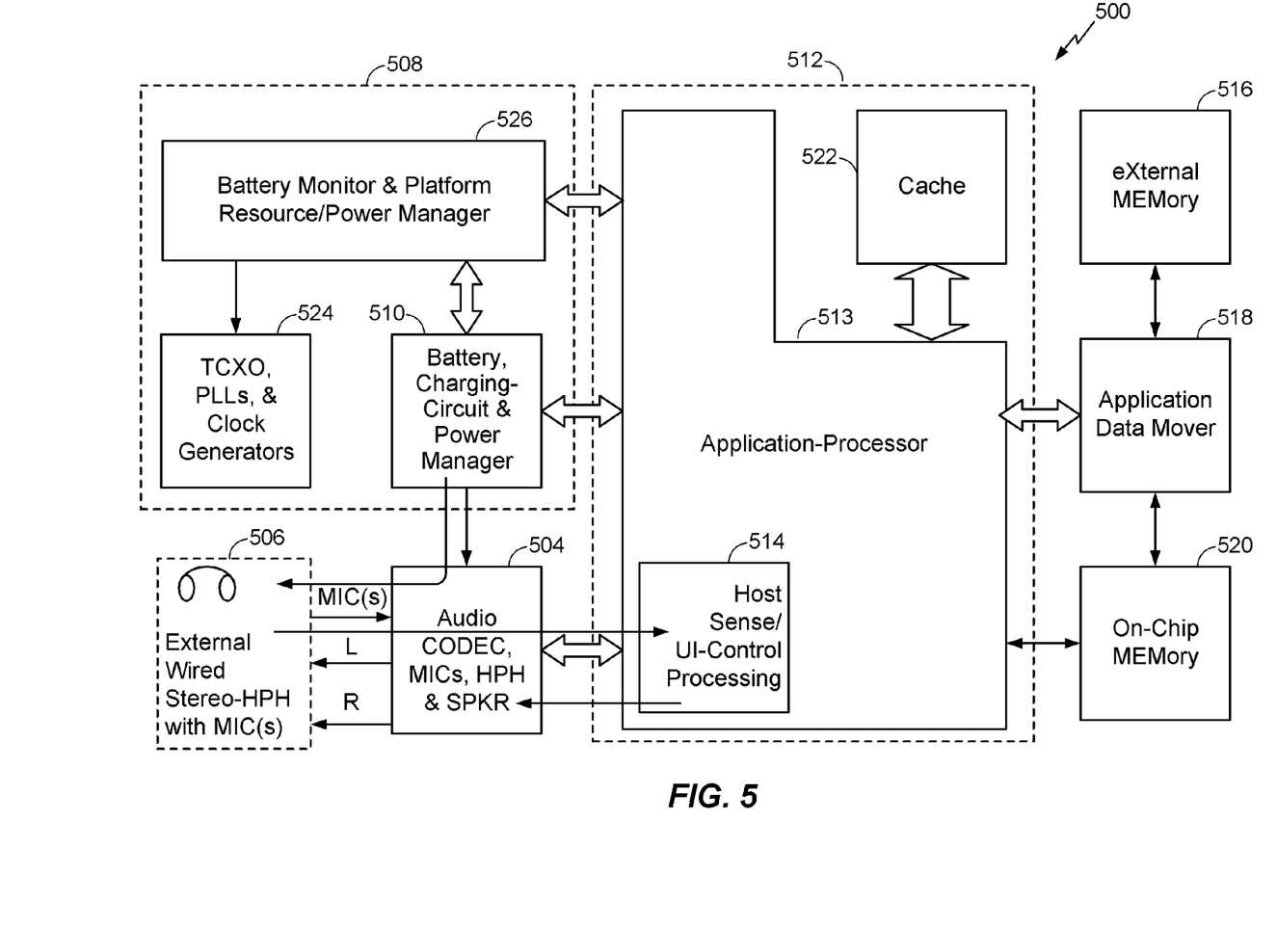
FIG. 5 is a schematic block diagram of a system having a sensing and user interface control processing subsystem, according to one embodiment.

FIG. 5 shows a block diagram of a system 500 having an external wired stereo headset 506, an audio codec 504, a host device 512 including an application processor 513, a power management subsystem 508, external memory 516, application data mover 518 and on-chip memory 520. The headset 506 can receive left and right audio signals from the audio codec 504, as directed by the application processor 513. The headset 506 may be equipped with active noise cancellation (ANC) microphones to provide noise cancellation functionality. These ANC microphones may be integrated into the audio codec 504 or may be separate units that are, directly or indirectly, coupled to the audio codec 504. The audio codec 504 may be part of the host or application processor 513 or it may be located in a separate processor.

The audio codec 504 may be powered by the power management subsystem 508 which includes a battery, charging-circuit and power manager 510. The power management subsystem 508, via the battery, charging-circuit and power manager 510 may also provide power to the headset 506 to power an integrated circuit located within the headset that may perform initial processing, such as voice or audio processing, or to power a detection subsystem located on the headset. The power to the integrated circuit located within the headset may be communicated through an existing headphone connector, such as the microphone bias connector.

The application processor 513 further includes a sensing/user interface control processing module 514. The sensing/user interface control processing module 514 provides instructions that direct the processor to determine a scan frequency to detect headset status, such as whether an earbud is within an ear in a listening position or is not in a listening position. In some embodiments, the integrated circuit within the headset can contain a RC oscillator circuit such as the circuit shown in FIG. 4. In these embodiments, the processor can identify one frequency corresponding to a left earbud location and a second frequency corresponding to a right earbud location, such as whether the earbud is in a listening position in a user's ear. The sensing/user interface control processing module 514 can further provide instructions to direct the host processor to scale audio processing and adjust audio renditions to maximize battery life-cycle and QoS depending on the detected status of the headset.

The wired headset 506 can "hijack" or receive power and transmit data through the existing headset conductors located on a plug of the headset that connect with a typical legacy connector in a host device. This power can be used to power a minimum hardware subsystem contained within the wired headset 506 to signal the earpiece(s) location (within or on the ear in a listening position or away from the ear in a non-listening position). The headset hardware subsystem can also provide UI control. Using the existing wired headset conductors, the host can also detect headset status or context and receive UI commands to scale audio processing to maximize battery cycle-life and QoS.

As discussed above, the headset can contain a minimum hardware subsystem that can detect whether an earbud is within a user's ear and provide user interface controls to control operation of the device from the headset. In some embodiments, the hardware subsystem can include a capacitive touch sensor and an RC oscillator, as shown in FIG. 4.

Figure 6:
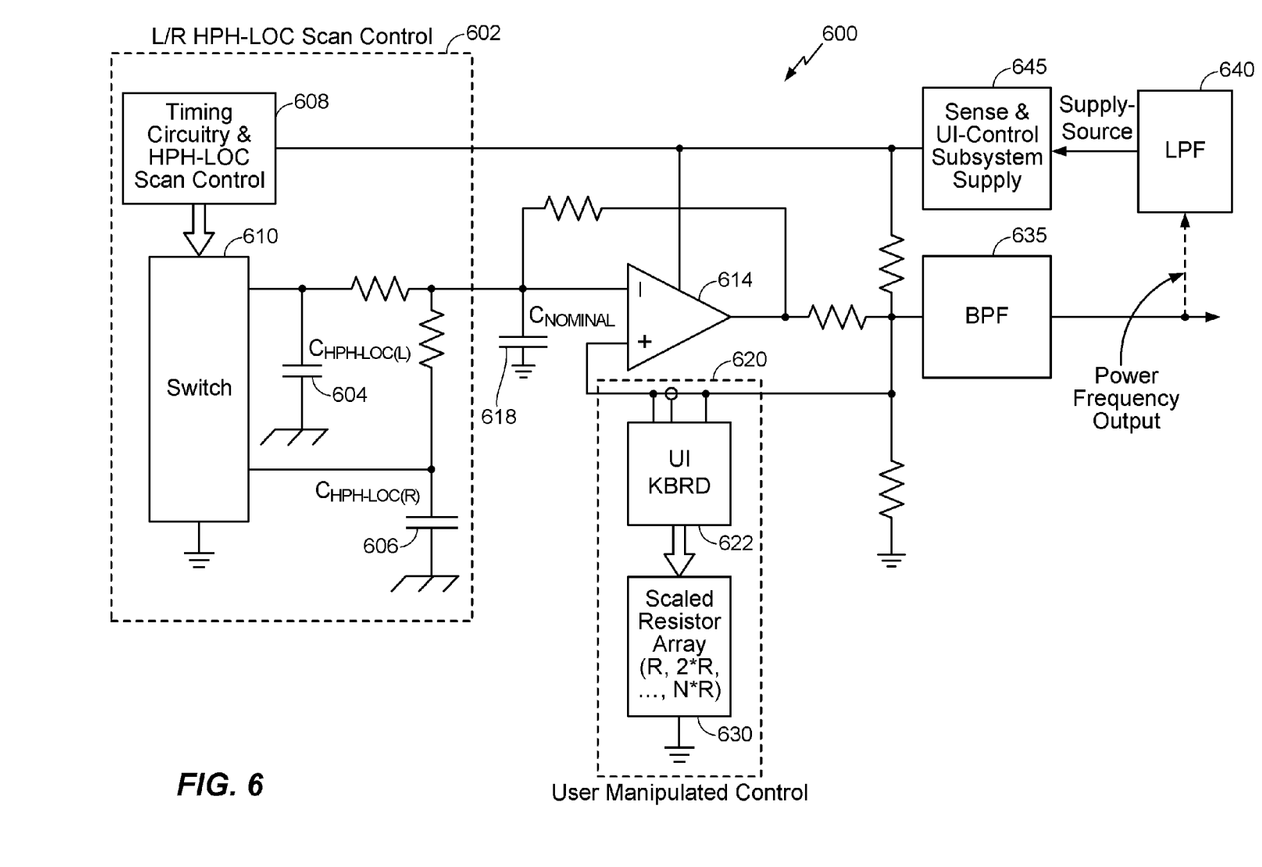
FIG. 6 is a circuit diagram of a sensing implementation incorporating an RC oscillator, according to one embodiment.

FIG. 6 illustrates one embodiment of a headset sensing and UI control circuit 600 that includes an RC oscillator circuit for controlling an electronic device through a headset port. A headset scan control module 602 includes a left touch capacitor electrode 604 and a right touch capacitor electrode 606. The left and right capacitor electrodes 604, 606 may be respectively located on the left and right earbuds of a headset and can be used to change the RC oscillator relaxation frequency to different values for each headphone. The change in tone or frequency can reliably indicate whether the left and/or the right earbud are located within a user's ear or not. Changing RC oscillator components, such as the resistor and capacitor, can alter the oscillator's relaxation frequency. Additional distinct tones can be also used to detect a corresponding UI command, such as play, pause, rewind, fast forward, etc.

As shown the scan control module 602 includes not only the left and right capacitor electrodes 604, 606, but also a timing circuit and scan control logic 608 and switch 610. As discussed above with respect to FIG. 4, the left and right capacitor electrodes 604, 606 are different, providing distinctly different resonance frequency shifts when they are contacted by a user.

The scan control module 602 is electrically connected to the negative input of a logic gate 614 and a nominal capacitor $C_{NOMINAL}$ 618. The positive side of the logic is input from a user manipulated control circuit 620 that includes a keyboard user interface (UI) 622 and a scaled resistor array 630. In addition, the output from the logic gate 614 passes through a bandpass filter 635 and then is sent though the headphone wires to the headphone port of an electronic device.

Power from the microphone line of the electronic device can be passed through a line pass filter 640 into a sense and UI control subsystem power supply 645 which supplies power to the logic gate 614 and the scan control module 602.

Figure 7:
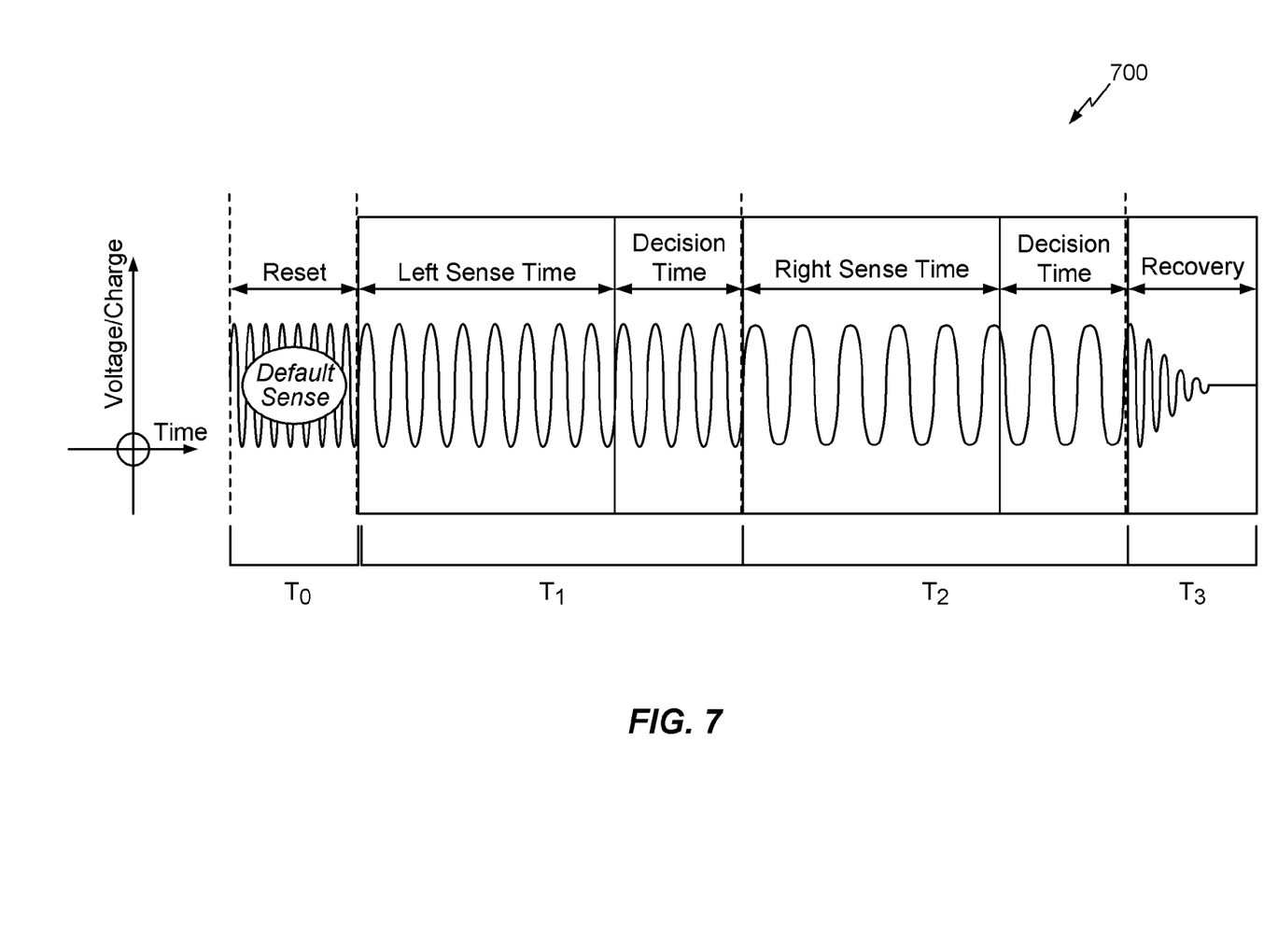
FIG. 7 is a diagram illustrating different RC oscillator relaxation frequencies that can be used to distinguish between left and right earphone location and detection.

FIG. 7 is a diagram 700 that illustrates how the change in oscillator relaxation frequency can be used to detect headset status. For example, time $T_0$ is the RESET window which may be used by the headphones or other device to generate a default sensing frequency. At time $T_1$ the system detects and determines the frequency of the left capacitive touch panel. At a time $T_2$ the system detects and determines the frequency of the right capacitive touch panel. The system then recovers for a time period of $T_3$.

Figure 8:
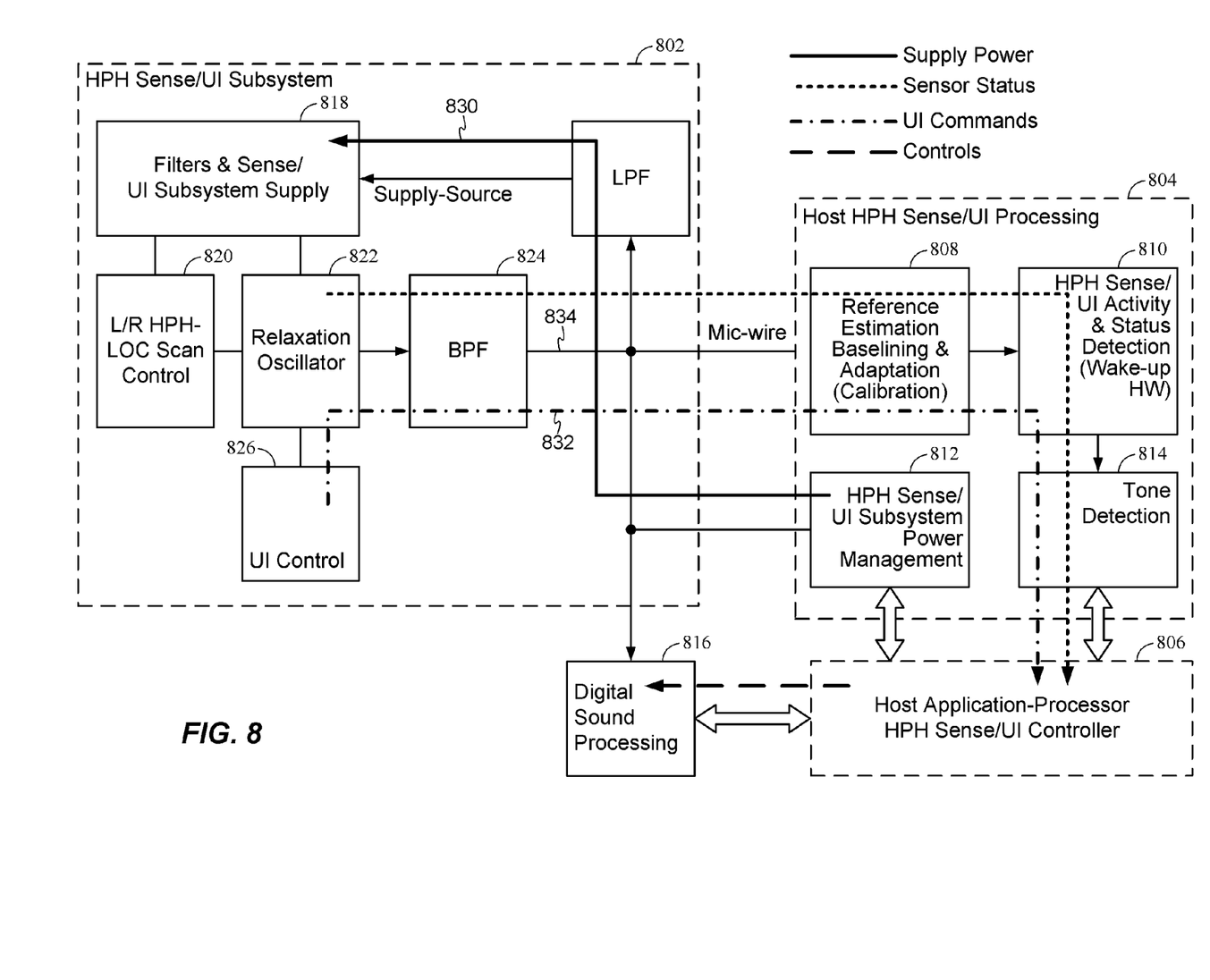
FIG. 8 is a schematic block diagram of a sensing and user interface control processing subsystem, according to one embodiment.

This process is shown in block diagram form in FIG. 8. One embodiment of the interaction between a headset sensing and user interface control subsystem 802 and a host sensing and user interface processing subsystem 804 is shown in FIG. 8. The headset sensing and user interface subsystem 802 includes a left and right headset location scan control module 820, an RC relaxation oscillator 822, and a user interface control module 826. The host device headset sensing and UI processing subsystem 804 includes a reference estimation module 808, a status detection module 810, a power management module 812, and a tone detection module 814.

Upon sensing the location status of the headset left and/or right earbuds, the UI control module 826 changes the RC oscillator 822 relaxation frequency, signaling corresponding UI commands to the host processor. This signal is sent through a BPF 824 before being processed by reference estimation module 808, the status detection module 810, and the tone detection module 814 of the host device headset sensing and UI processing subsystem 804. The earbud status signal is sent to the host application processor sensing and UI controller 806 for processing.

The headset sensing and UI control subsystem 802 receives supply power via an existing headset connector. The power may be supplied by a power management module 812 of the host headset sensing and UI processing subsystem 804 of the host processor.

Figure 9:
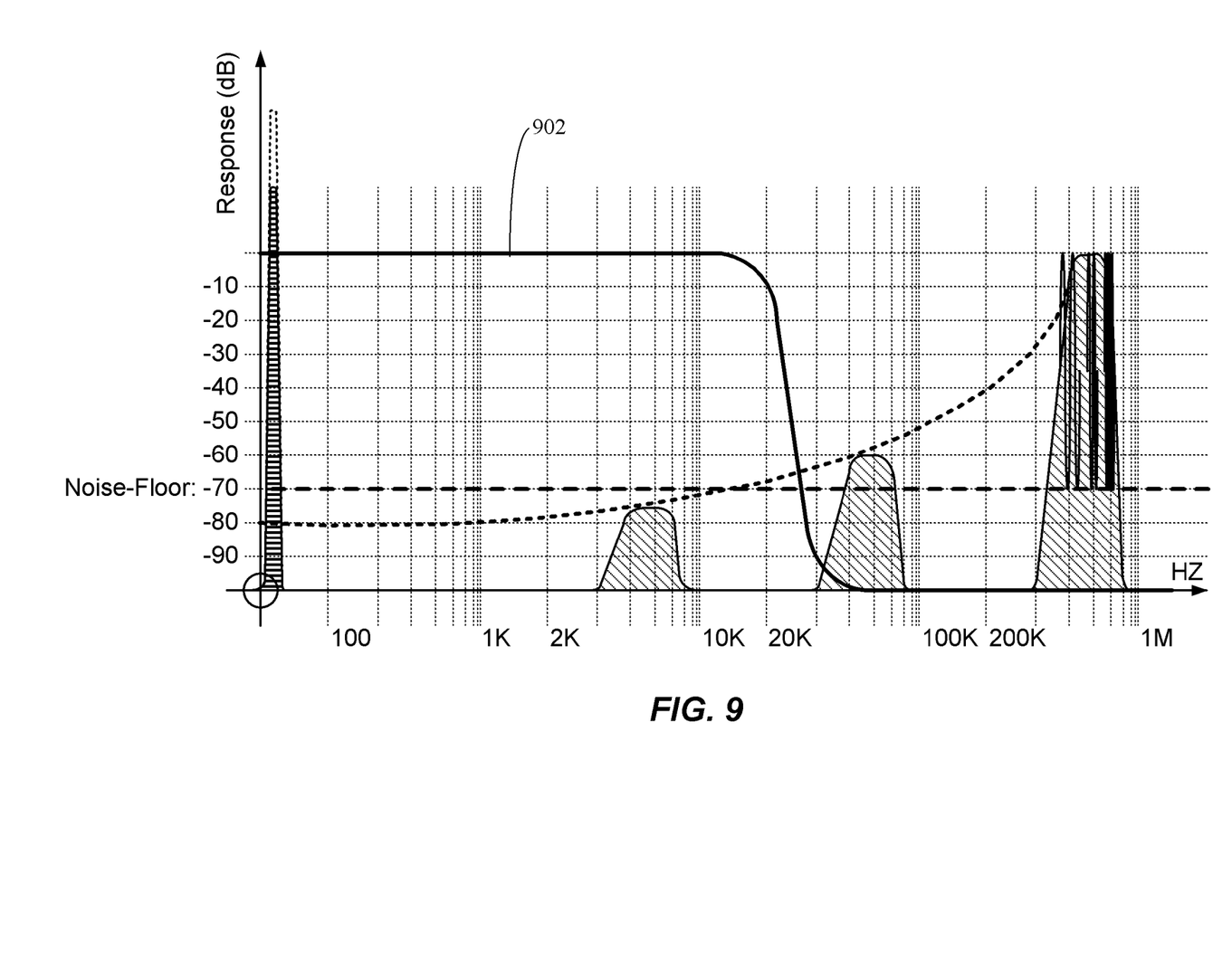
FIG. 9 is a graph representing the host power and sensing and user interface control subsystem signaling filtered to minimize interference, according to one embodiment.

A spectrum and noise interface plot is shown in FIG. 9. The host power and UI sensing and control subsystem signaling, as indicated by the dark line 902, should be sufficiently filtered to minimize the worst-case interference. This interference is preferably below the microphone's noise floor.

Figure 10:
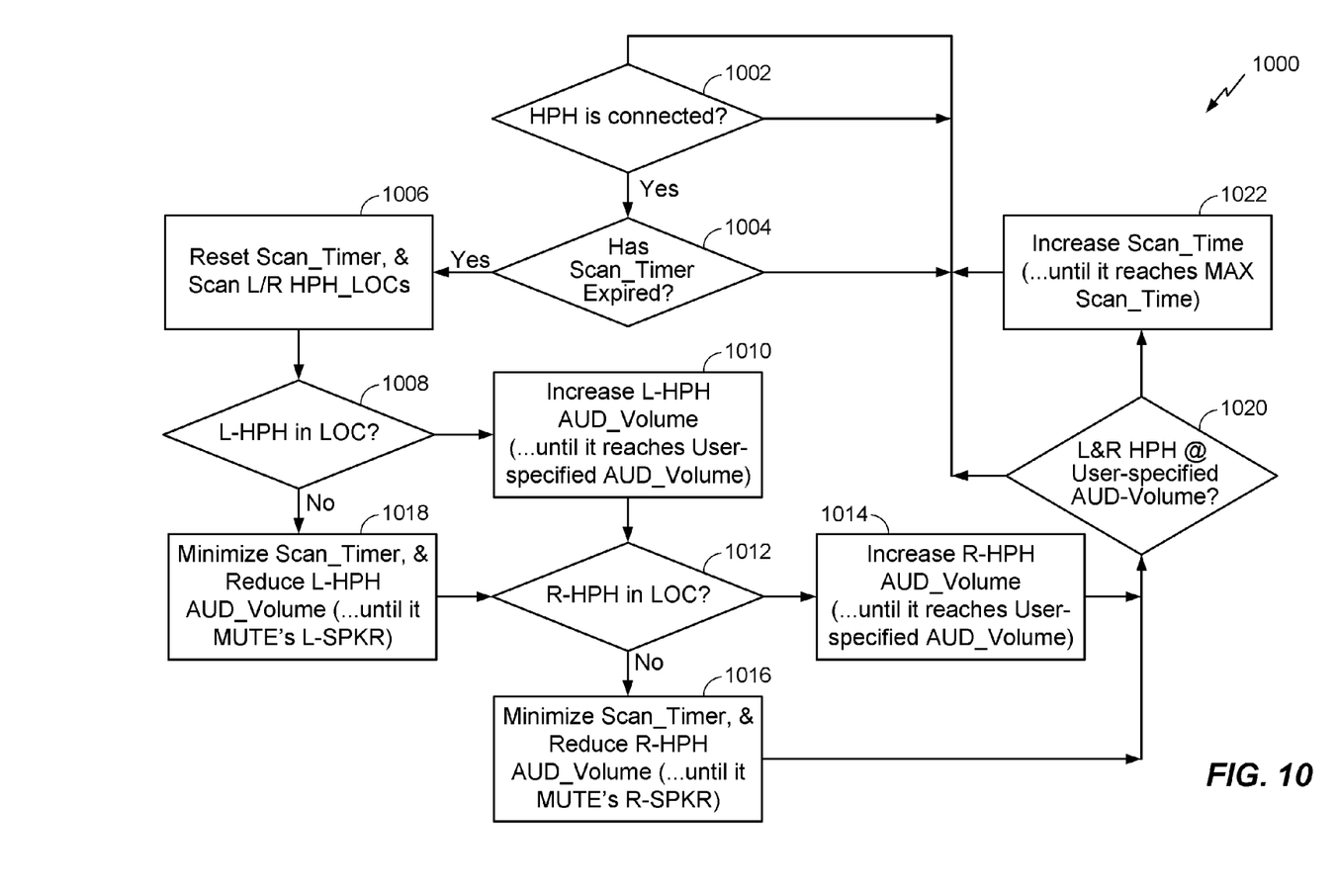
FIG. 10 is a flowchart illustrating a method for operating the headset user interface sensing and control subsystem in connection with a host device, according to one embodiment.

A flow chart illustrating one embodiment of a process 1000 for headset UI sensing and control that may be implemented with a headset including a detection subsystem connected to a host processor is shown in FIG. 10. Process 1000 may be used in some embodiments to detect whether a left and/or a right earbud is located in or on a user's ear.

The process 1000 begins at block 1002 wherein the headset connection is determined. If a headset is connected, process 1000 transitions to block 1004, wherein the scan time is determined. If the scan time has expired, then process 1000 transitions to block 1006 wherein the scan timer is reset and the left and right earbud touch sensors are scanned. After the left and right touch sensors have been scanned, process 1000 transitions to block 1008 wherein the status of the left earbud is determined. If the left earbud is located in or on a user's ear, the host processor is signaled to increase the audio volume in the left earbud speaker to a user-specified volume level, as indicated in block 1010. However, if the left earbud is not located in or on a user's ear, as determined by the touch sensor located in the left earbud, process 1000 transitions to block 1018 wherein the scan time is minimized and the left speaker audio volume is decreased or muted.

Once the left earbud status and volume are determined, process 1000 transitions to block 1012 wherein the status of the right earbud is determined. Similar to the steps described above with respect to the left earbud, if the right earbud is determined to be in or on a user's ear, process 1000 transitions to block 1014 wherein the host processor is signaled to increase the audio volume in the right earbud speaker to a user-specified volume level. However, if the right earbud is not located in or on a user's ear, as determined by the touch sensor located in the right earbud, process 1000 transitions to block 1016 wherein the scan time is minimized and the right speaker audio volume is decreased or muted.

Once both left and right earbud status and volume are determined, process 1000 transitions to block 1020 wherein the left and right earbud volumes are verified to be at the user specified volume levels. If these levels are correct, process 1000 repeats scanning the left and right earbud touch sensors to determine if a change occurs in the earbud location status. Otherwise, process 1000 transitions to block 1022 wherein the scan time is increased until a maximum scan time is reached. The process 1000 then continues scanning the left and right earbud touch sensors.

Figure 11:
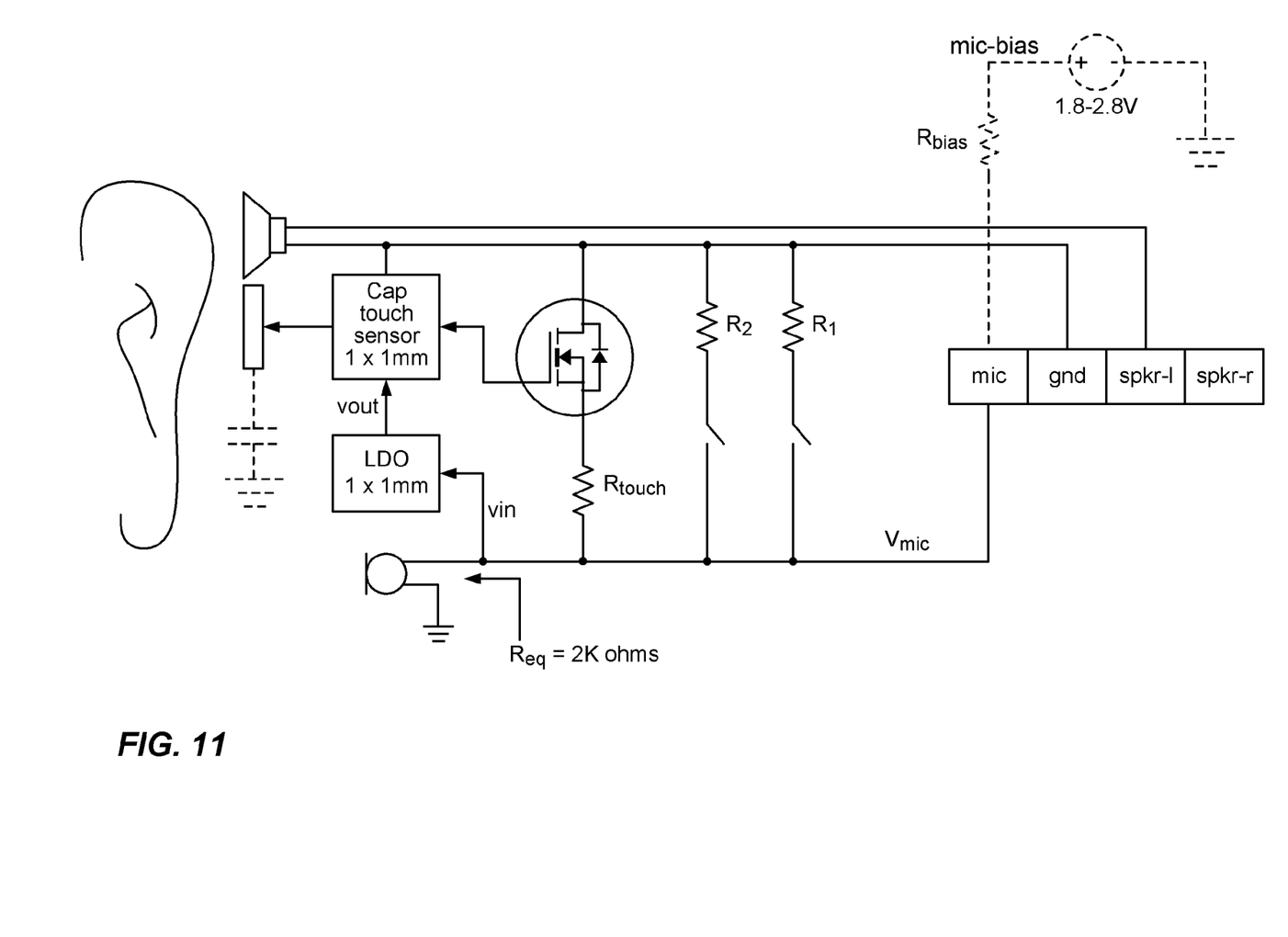
FIG. 11 is a circuit diagram illustrating a second embodiment of a sensing implementation incorporating voltage switching.

Another implementation of a touch sensor detection circuit is shown in FIG. 11. In this illustration, a voltage regulator circuit is shown in which information on whether the earbud is located within a user's ear is sent back to the host processor in the form a voltage shift signal. Depending on whether the left earbud and/or the right earbud are located within a user's ear, the voltage will shift downwards by different amounts. Additionally, different voltage shifts may be used to signal different user interface commands. As in the frequency shift circuit implementation shown in FIG. 6, the voltage shift implementation shown in FIG. 11 uses the existing three wire headset connectors to relay information to the host processor and receive power. Frequency can be changed to voltage levels which can be converted by a digital-to-analog converter to a scalar value. The voltage regulator circuit shown in FIG. 11, in combination with a headset such as that shown in FIGS. 1-2, may be another means for modulating an electronic signal to the headset connection based on touch detection.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. References to a "direction" or "orientation" of a microphone of a multi-microphone audio sensing device indicate the direction normal to an acoustically sensitive plane of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

The terms "coder," "codec," and "coding system" are used interchangeably to denote a system that includes at least one encoder configured to receive and encode frames of an audio signal (possibly after one or more pre-processing operations, such as a perceptual weighting and/or other filtering operation) and a corresponding decoder configured to produce decoded representations of the frames. Such an encoder and decoder are typically deployed at opposite terminals of a communications link. In order to support a full-duplex communication, instances of both of the encoder and the decoder are typically deployed at each end of such a link.

In this description, the term "sensed audio signal" denotes a signal that is received via one or more microphones, and the term "reproduced audio signal" denotes a signal that is reproduced from information that is retrieved from storage and/or received via a wired or wireless connection to another device. An audio reproduction device, such as a communications or playback device, may be configured to output the reproduced audio signal to one or more loudspeakers of the device. Alternatively, such a device may be configured to output the reproduced audio signal to an earpiece, other headset, or external loudspeaker that is coupled to the device via a wire or wirelessly. With reference to transceiver applications for voice communications, such as telephony, the sensed audio signal is the near-end signal to be transmitted by the transceiver, and the reproduced audio signal is the far-end signal received by the transceiver (e.g., via a wireless communications link). With reference to mobile audio reproduction applications, such as playback of recorded music, video, or speech (e.g., MP3-encoded music files, movies, video clips, audiobooks, and podcasts) or streaming of such content, the reproduced audio signal is the audio signal being played back or streamed.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A device for communicating with an electronic device through a headset port, comprising:
   a control device comprising a first capacitive touch sensor, wherein the control device is configured to receive power and communicate with the electronic device through a headset connection; and
   a modulation circuit within the control device and configured to modulate an electronic signal to the headset connection based on contact with the capacitive touch sensor; wherein the device is a headset having at least one earpiece, and wherein the at least one earpiece comprises the capacitive touch sensor; and wherein transmission of audio signals to the at least one earpiece may be discontinued if the at least one earpiece is not touching a user's ear.

2. The device of claim 1, wherein the device is a headset having earpieces, and wherein at least one earpiece comprises the capacitive touch sensor.

3. The device of claim 1, wherein the device is further configured to transmit user interface control signals to the electronic device and receive user interface control signals from the electronic device.

4. The device of claim 3, wherein the headset comprises a left earpiece and a right earpiece, the left earpiece further comprising a first capacitive touch sensor and the right earpiece further comprising a second capacitive touch sensor.

5. The device of claim 4, wherein the modulation circuit is configured to transmit a first relaxation frequency based on a signal received from the first capacitive touch sensor and transmit a second relaxation frequency based on a signal received from the second capacitive touch sensor.

6. The device of claim 3, wherein transmission of audio signals to the at least one earpiece is completed only when the at least one earpiece is touching a user's ear.

7. The device of claim 3, wherein the modulation circuit further comprises a resonator circuit configured to transmit different relaxation frequencies depending on an indicated user interface command.

8. The device of claim 7, wherein the modulation circuit is configured to transmit a first relaxation frequency if the at least one earpiece is touching the user's ear and a second relaxation frequency if the at least one earpiece is not touching the user's ear.

9. The device of claim 1, wherein the headset connection is a 3.5 mm or a 2.5 mm headset receptacle.

10. The device of claim 1, wherein the modulation circuit further comprises a voltage regulator circuit configured to transmit user interface commands by adjusting the voltage level through the headset connection.

11. An apparatus for communicating with an electronic device, comprising:
    means for detecting touch configured to receive power and communicate with the electronic device through a headset connection; and
    means for modulating an electronic signal to the headset connection based on touch detection; wherein the device is a headset having at least one earpiece, and wherein the at least one earpiece comprises the capacitive touch sensor; and wherein transmission of audio signals to the at least one earpiece may be discontinued if the at least one earpiece is not touching a user's ear.

12. The apparatus of claim 11 further comprising means for transmitting user interface control signals to the electronic device and means for receiving user interface control signals from the electronic device.

13. The apparatus of claim 11, wherein the means for detecting touch comprises a first capacitive touch sensor in a first earpiece and a second capacitive touch sensor in a second earpiece.

* * * * *